United States Patent
Davidson et al.

(10) Patent No.: US 7,206,716 B2
(45) Date of Patent: Apr. 17, 2007

(54) WHEEL ALIGNMENT WITH SURFACE-ORIENTED RUNOUT DETERMINATION

(75) Inventors: Niall Davidson, Little Rock, AR (US); James L. Dale, Jr., Conway, AR (US); Eric Bryan, Conway, AR (US)

(73) Assignee: Snap-On Incorporated, Pleasant Prairie, WI (US)

( * ) Notice: Subject to any disclaimer, the term of this patent is extended or adjusted under 35 U.S.C. 154(b) by 0 days.

(21) Appl. No.: 10/864,879

(22) Filed: Jun. 10, 2004

(65) Prior Publication Data

US 2005/0027473 A1 Feb. 3, 2005

Related U.S. Application Data

(60) Provisional application No. 60/477,368, filed on Jun. 11, 2003.

(51) Int. Cl.
*G01C 9/00* (2006.01)
*G01C 17/00* (2006.01)
*G01C 19/00* (2006.01)

(52) U.S. Cl. .................. 702/151; 356/138; 700/302
(58) Field of Classification Search ................ 702/151; 33/228, 203.13, 288
See application file for complete search history.

(56) References Cited

U.S. PATENT DOCUMENTS 4,180,915 A * 1/1980 Lill et al. ..................... 33/228
4,594,789 A    6/1986 Marino et al.
5,014,227 A    5/1991 Kling et al.
5,046,032 A    9/1991 Alusick et al.
5,313,711 A    5/1994 Kling et al.
5,760,938 A *  6/1998 Hodge ........................ 359/641
5,969,246 A   10/1999 Jackson et al.
6,194,999 B1 * 2/2001 Uhl et al. ................... 340/447
6,658,751 B2 * 12/2003 Jackson et al. ............... 33/293

FOREIGN PATENT DOCUMENTS

EP  0880 009 A2  11/1998

OTHER PUBLICATIONS

"DSP200/250 Series Wheel Alignment Sensors", Operation Instructions, Hunter Engineering Company 1994, pp. 1-25.
"Evaluation of the Performance Of Electronic Wheel Alignment Equipment"; Hunter Engineering Company 1993, 1997, pp. 1-16.

* cited by examiner

*Primary Examiner*—John Barlow
*Assistant Examiner*—Sujoy Kundu
(74) *Attorney, Agent, or Firm*—McDermott Will & Emery LLP (57) ABSTRACT

Methods and systems for measuring and calculating wheel alignment angles are disclosed. The measuring methods include mitigating alignment error by compensating for wheel runout, and further include measuring wheel runout while the wheel maintains contact with an alignment surface.

13 Claims, 7 Drawing Sheets

WHEEL ALIGNMENT WITH SURFACE-ORIENTED RUNOUT DETERMINATION

RELATED APPLICATION

This application claims the benefit under 35 U.S.C. § 119(e) of U.S. Provisional Patent Application No. 60/477, 368 filed on Jun. 11, 2003, entitled "Rollback with Conventional Aligner as Check or Compensation," which is incorporated by reference herein in its entirety.

TECHNICAL FIELD

The disclosures herein relate to wheel alignment systems, and to methods and devices for measuring various relevant parameters. More specifically, the disclosures relate to methods and devices for measuring the various alignment angles of wheels on a vehicle while they remain in constant contact with an alignment surface.

BACKGROUND

Wheel alignment is a process of adjusting the angles of wheels on a vehicle so that they are generally perpendicular to the ground and parallel to one another. The purpose of such adjustments is to attain maximum tire life, as well as to ensure that the vehicle tracks straight when driving along a straight and level road.

In order to adjust the wheel angles to achieve proper wheel alignment, the actual wheel angles must first be measured, such that the requisite adjustments may then be calculated. Two particular angles that are utilized in wheel alignment methods are commonly referred to as "camber" and "toe." Camber, which is typically measured in degrees, is the angle of the wheel's deviation from a vertical plane. Therefore, camber is angle of the wheel that is seen when viewed from the front of the vehicle. If the top of the wheel is leaning out from the center of the car, the camber is positive; if it is leaning in toward to center of the car, then the camber is negative. Toe may be defined as the distance difference between the front of a pair of tires and the back of the pair of tires, in which case the measurement is linear, in units of either inches or millimeters. Alternately, toe may be defined as the angle between a pair of tires (total toe), or as the angle of a tire relative to the vehicle's longitudinal direction (individual toe), in which case the measurement is angular and the units are in degrees. Wheel alignment systems often involve mounting measurement instruments to the wheels and using an angular measurement method. Toe is usually set close to zero degrees, meaning that the wheels are substantially parallel to one another. "Toe-in" means that the fronts of the tires are closer to each other than the rears; "toe-out" is the opposite situation.

Some types of wheel alignment procedures involve placing instrumentation on each of a vehicle's four wheels. The instrumentation may be assembled together in a "head" that is clamped to each of the wheels. A head may include a transmitting device such as an LED emitter, and a receiving device such as a photosensor. During an alignment procedure, the receiving device of each head "looks" at the transmitted light from two heads of the two adjacent wheels. The optical "box" that is formed around the four wheels by the transmitting devices may thus be sensed by the receiving devices as the wheels are rotated, and the various wheel angles may thereby be calculated.

Unfortunately, such procedures involve certain inherent measurement inaccuracies and can therefore result in alignment errors. For example, if a head is clamped to a wheel incorrectly, inaccurate measurements may result. Also, wobble in a rotating wheel may cause inaccuracies in the direction of either the transmitter or the receiver in any of the heads. Wobble, hereinafter referred to as "runout," is a condition in which the wheel experiences a varying camber and toe as it rotates about its axis. Because runout may affect the camber and toe measurements at any particular point in a wheel's rotation during an alignment procedure, it may result in an inaccurate alignment.

Therefore, wheel alignment methods of the past have attempted to compensate for runout in order to produce more representative angle measurements and achieve a more accurate alignment. However, these "runout compensation" methods may cause a disruption in the car's balance, thereby compromising the alignment. For example, some known runout compensation methods involve lifting the wheels of a vehicle above the alignment surface, and rotating the free wheels while measuring runout (i.e., an elevated runout compensation). After the runout is determined, the wheels are returned to the alignment surface, and the remaining portions of the wheel alignment procedure are performed, using the determined runout for any necessary compensation. However, when a vehicle is lifted off of an alignment surface and then set back down again, it likely does not settle back to its natural position. Rather, it may be some amount of time before the vehicle does settle back to its natural position and retain its original balance. Thus, although potential runout may be compensated for by lifting the wheels off of the alignment surface to spin them and obtain measurements of their runout, such methods in turn create the potential for performing an alignment on a car that is now not settled to its natural stance, which itself may result in an improper alignment.

What is needed is a wheel alignment method that allows for runout compensation without affecting a vehicle's stance. Specifically, what is needed is a method for performing accurate wheel alignments in which runout compensation is achieved while the wheels remain in constant contact with an alignment surface, thereby retaining the vehicle's natural stance.

SUMMARY

The methods and devices disclosed herein help solve these and other problems by providing a non-disruptive means for measuring and calculating a variety of alignment parameters. The calculations include runout compensation, and the alignment methods include measuring runout while the wheels of a vehicle remain in constant contact with an alignment surface. Also provided are methods for measuring alignment angles with heads that are locked in position on the vehicle's wheels.

In one aspect, a method for calculating a wheel alignment angle includes placing a plurality of wheels on a surface such that the wheels can be rotated while maintaining contact with the surface, measuring wheel runout of each of the plurality of the wheels while the wheel is on the surface, measuring at least one uncompensated alignment angle for each of the plurality of wheels, and calculating at least one compensated alignment angle of each of the plurality of wheels as a function of the wheel runout and the uncompensated alignment angle.

In another aspect, a method for measuring wheel runout includes placing a wheel on a surface such that the wheel can be rotated while maintaining contact with the surface and rotating the wheel through a plurality of contact points with the surface. The method further includes measuring camber at each of the plurality of contact points and measuring toe at each of the plurality of contact points, then identifying a circle whose circumference substantially coincides with a combination of the camber and toe measurements at each of the plurality of contact points and measuring the radius of the identified circle.

Additional aspects and advantages of the present disclosure will become readily apparent to those skilled in this art from the following detailed description, wherein only exemplary embodiments are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

The accompanying drawings illustrate several embodiments and, together with the description, serve to explain the principles of the present disclosure.

DETAILED DESCRIPTION OF THE EMBODIMENTS

The present disclosure is now described more fully with reference to the accompanying figures, in which several embodiments are shown. The embodiments described herein may include or be utilized with any wheel bearing vehicle including automobiles, trucks, motorcycles, airplanes, and the like. One skilled in the art will recognize that methods, apparatus, systems, data structures, and computer readable media implement the features, functionalities, or modes of usage described herein. For instance, an apparatus embodiment can perform the corresponding steps or acts of a method embodiment.

Figure 1:
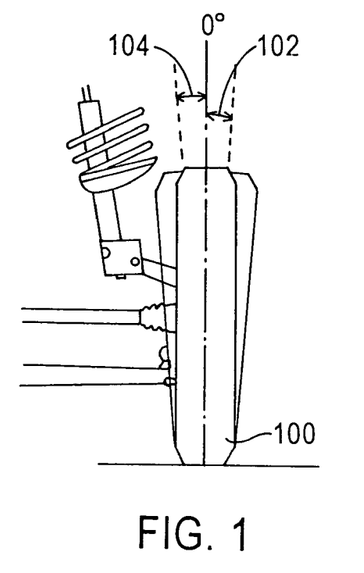
FIG. 1 illustrates camber as measured by an exemplary wheel alignment system.

FIG. 1 illustrates camber as measured by an exemplary wheel alignment system. Camber is the angle of the wheel 100, generally measured in degrees, when viewed from the front of the vehicle. If the top of wheel 100 is leaning out from the center of the vehicle, then the camber is positive as indicated at angle 102. If the top of wheel 100 is leaning in toward the center of the vehicle, then the camber is negative as indicated at angle 104.

Figure 2A:
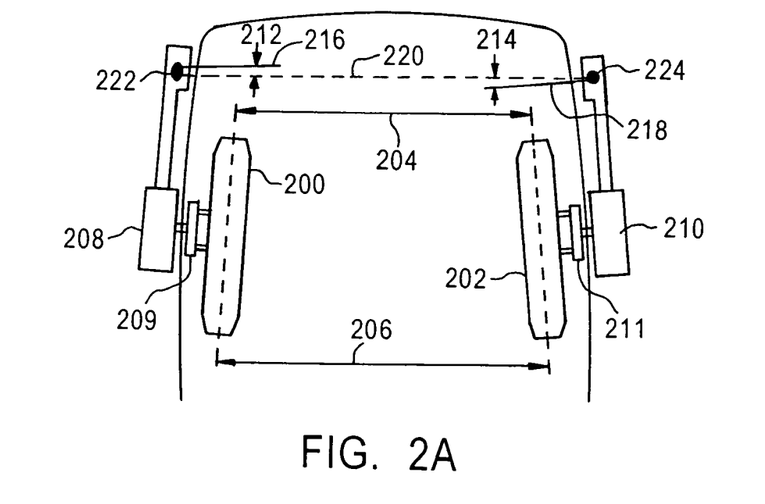
FIG. 2A illustrates total wheel toe as measured by an exemplary wheel alignment system.
Figure 2B:
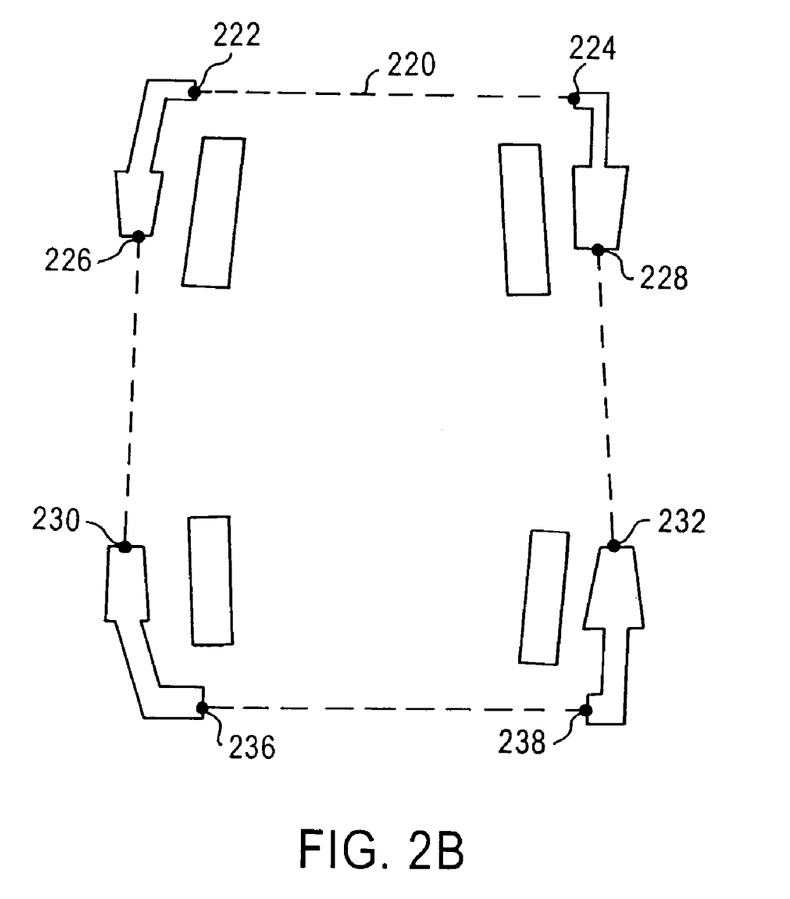
FIG. 2B illustrates the sensor setup to measure individual wheel toe by an exemplary wheel alignment system.

FIG. 2A illustrates toe as measured by an exemplary wheel alignment system. Two adjacent tires 200 and 202 have attached wheel clamps 209 and 211, which support measurement heads 208 and 210. These measurement heads contain optical sensors 222 and 224 which establish an optical path 220 therebetween. The sensors measure the angle 212 and 214 of the optical path relative to a zero reference line 216 and 218 in each sensor. These angles 212 and 214 may be summed to determine the total toe angle between the pairs of wheels. Alternately, these angles 212 and 214 may be combined with other sensors 226, 228, 230, 232, 236 and 238, as illustrated in FIG. 2B, to calculate individual wheel toe relative to the vehicle's longitudinal axis. Such calculations are understood by those skilled in the art. Toe calculations, for example, are further described in U.S. Pat. No. 5,519,488, which is incorporated herein by reference.

Figure 3:
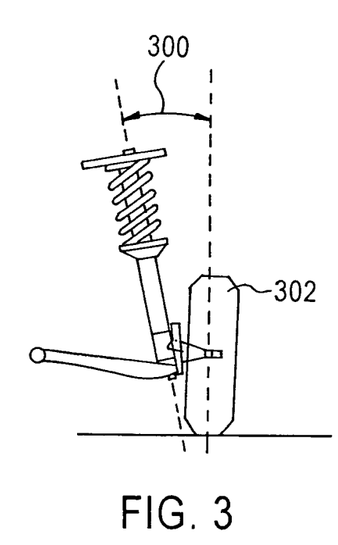
FIG. 3 illustrates steering axis inclination as measured by an exemplary wheel alignment system.

FIG. 3 illustrates steering axis inclination (SAI) as measured by an exemplary wheel alignment system. The SAI angle 300 is typically expressed in degrees, and represents the steering pivot line when viewed from the front of a vehicle. SAI causes the vehicle to lift slightly when its wheel 302 is turned away from a straight ahead position, thereby producing within the vehicle an affinity for the straight ahead position and giving stability to the steering system.

Figure 4:
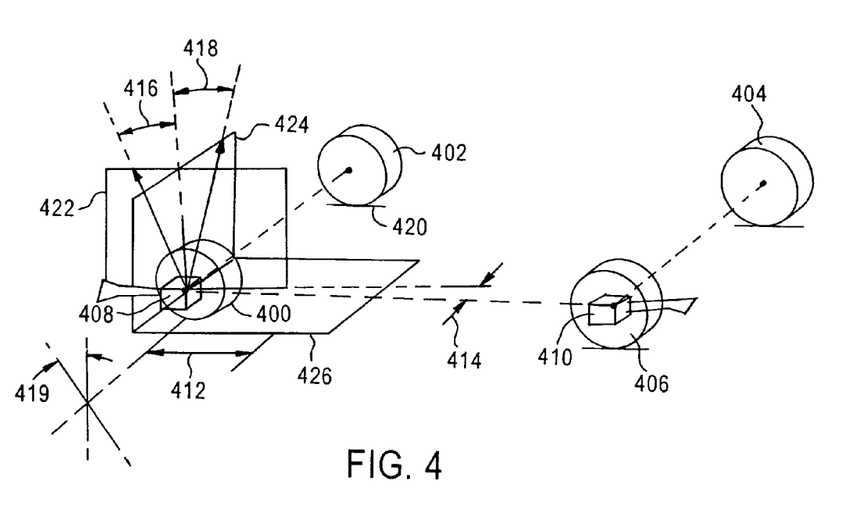
FIG. 4 illustrates an exemplary wheel alignment setup and various angles of measurement.

FIG. 4 illustrates an exemplary wheel alignment setup and various angles of measurement. In the exemplary setup, a vehicle has four wheels 400, 402, 404, 406 arranged for alignment testing. Measurement heads 408, 410 may be attached to each wheel. For example, measurement head 408 is attached to wheel 400, and measurement head 410 is attached to wheel 406. Wheels 402 and 404 may also have measurement heads attached to them (not illustrated). Wheels 400 through 406 may be rotated through a distance 412 while measurement heads make a series of measurements, as described in further detail below, of various alignment angles. For example, angles measured by measurement head 408 may include toe 414, head pitch angle 416, camber 418, and a rotation angle between head and wheel 419. Toe 414 as measured for wheel 400 may be measured relative to a measurement head 410 attached to wheel 406, while head pitch angle 416 and camber 418 may be measured relative to gravity. The rotation angle between head and wheel may be measured by an angle rotation sensor, such as an encoder.

Measurement heads 408 and 410 may include camber inclinometers and SAI inclinometers, such as accelerometers, optical sensors, shaft rotation sensors such as encoders, or other suitable sensors. Rollback distance 412 may be the resultant distance of a rollback angle between approximately 30 degrees and 50 degrees, although other angles are possible as well. Rollback angles less than 30 degrees are theoretically acceptable, but practically, they may provide insufficient sensor changes for accurate resolution of measurements and calculation of an accurate result. Rollback angles of greater than 50 degrees provide excellent data, but are often not practical due to space limitations in the alignment area, for example, the length of the alignment platform may be insufficient for greater roll angles. The rollback angle may be selected such that the resultant rollback distance 412 allows wheels 400, 402, 404 and 406 to remain on an alignment surface, such as surface 420, while measurements are taken.

In one exemplary embodiment, measurement heads 408 and 410 are attached to wheels 400 and 406 but are in an unlocked state, such that they do not rotate with the wheels 400 and 406 when wheels 400 and 406 are rotated. Wheels 400 and 406 are rotated through a rollback angle approximately between 30 degrees and 50 degrees, while measurement heads 408 and 410 take multiple toe and camber measurements (i.e., measurements of wheel parameters). Data representing the multiple toe and camber measurements are stored until after the rollback and measurement process is completed. The maximum and minimum values for each sensor on every head, such as for the toe sensor and camber sensor on measurement heads 408 and 410, are identified, and the maximum change in toe and camber for each sensor is calculated. The maximum change is then compared in each plane 422, 424, 426 to a predetermined threshold value for each of those planes. As one skilled in the art will appreciate, the threshold value may vary depending upon certain conditions such as vehicle type, permitted tolerances, and the like.

Threshold determination, based upon vehicle tolerances, is now described by way of example. Toe tolerance is 0.25 degrees, and camber tolerance is 1.0 degrees. The toe tolerance is tighter, so it becomes the limiting tolerance. For this example, it is decided that the runout error should not be greater than 15% of the full tolerance level, so 0.25*0.15=0.0375 degrees allowable runout error. As the vehicle is rolled and the toe and camber readings are observed, the runout causes differing amounts of change in each sensor, depending upon the direction of the vector relative to the sensor plane. For this example, suppose that the vehicle wheels are rolled 45 degrees. The sum of the sensor ranges should be between 83% and 100% of the scalar runout value. Being conservative, the sum of the sensor ranges is allowed to be within the threshold of 0.0375*0.83=0.0311 degrees.

The threshold value is determined such that any change in toe or camber that exceeds the threshold value indicates that runout compensation should be performed. Therefore, comparison of the maximum change in toe and camber for each sensor to the predetermined threshold value is indicative of whether runout compensation is necessary. If the predetermined threshold value is not exceeded, then runout compensation may be deemed unnecessary. Accordingly, it may not be necessary to perform an elevated runout compensation procedure. As one skilled in the art will appreciate, in an embodiment of the present disclosure, runout compensation is performed regardless the magnitude of the runout (i.e., the threshold value is exceeded). More specifically, runout compensation measurements are made with the vehicle on the alignment surface rather than by performing an elevated compensation procedure with the attendant inaccuracies.

In another exemplary embodiment, measurement heads 408 and 410 are attached to wheels 400 and 406 in an unlocked state. The vehicle is rolled such that the wheels rotate an amount yielding rollback distance 412 small enough that wheels 400 and 406 remain on an alignment surface. Multiple toe and camber data points are measured and saved during the rolling process. When the rolling process is complete, and the wheels are centered on their respective turnplates, turntables or other alignment surface, additional toe and camber measurements are taken and saved as the reference point. The reference points are subtracted from the values of every other data point measured and stored during the rollback process. The result is a table of toe and camber values in relation to the reference point. Plotting camber versus toe define approximately an arc of a circle, and a best fit mathematical routine can be used to solve for the circle. The location of the circle's center represents true camber and toe of the vehicle, and the vector from the center of the center of the circle to the data point with the wheels centered on the turnplates would represent the runout vector with the wheels centered on the turntables.

For example, if the radius is 1.00 degree, this means that the axis of the wheel and the axis of the measuring head are out of parallel by 1.00 degree. The center of the circle represents the true alignment value of the wheel, and the circle represents the locus of possible readings from the alignment head, depending upon the rotational position of the wheel. If the runout vector (magnitude and direction) and the final position of the wheel are known, one can work from a known point on the circle and apply the vector to determine the true value (center of the circle). Furthermore, even if the suspension is adjusted, the same vector will correct the toe and camber readings, so long as the wheel does not rotate. If the measurement head includes a sensor (such as an encoder) as described below, wheel rotation can be sensed and the scalar value can be applied in a different direction, based upon the amount of wheel rotation.

The formulas for solving the circle may be defined as toe=M(sin(x)) and camber=M(cos(x)), where M is the magnitude of runout 412 and x is the rollback angle that achieves runout distance 412. The multiple values of camber and toe measured and stored during the rollback process are used to solve the above equations multiple times, for example three or more times. The value of x for which the vehicle is centered on the turntables represents the phase, or direction of the runout vector. Phase can then be split into a camber plane and a toe plane, yielding camber and toe components of the runout vector that is ultimately solved for. This process is described in further detail below.

When fitting multiple measured toe and camber values to the circle, a root mean squared (RMS) value is calculated to represent the quality of the fit that is calculated. If the RMS value (or error) exceeds a predetermined threshold, a user of the system may be alerted that the measured data is inconsistent. This may indicate that runout must be measured according to elevated runout measurement techniques. Problems resulting in a high RMS value may include steering looseness, suspension looseness, allowing the wheels to steer during the rollback procedure, or poor quality of the turntables or other alignment surface.

In an embodiment, data may be collected and processed in real-time as the wheels 400 and 406 (i.e., the vehicle) are being moved. Real-time processing of data enables the rollback to be terminated when a sufficient amount of data has been acquired. More specifically, a minimum number of points and minimum rollback angle can be used to establish a set of criteria. If the criteria are met during the rollback operation, then the rollback may be terminated early. If the data fit within a tolerance of the proper shape of the curve (i.e., there may be runout in the wheel, but the set of data correspond closely to the calculated values of what one would expect with that runout and the wheel in that position), then the rollback may be terminated. One advantage of this embodiment is the acquiring of the runout calculation by performing a small amount or a minimum amount of rollback.

Figure 5:
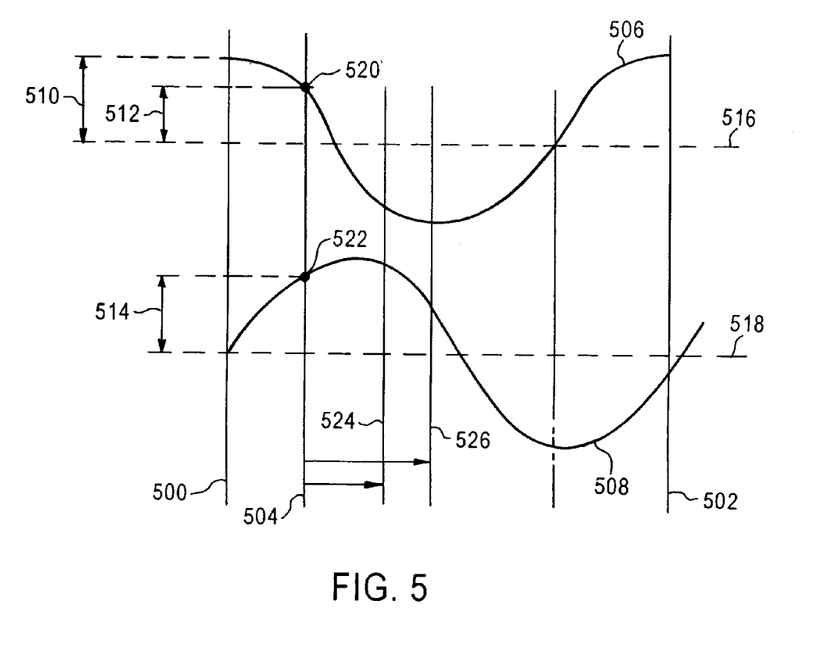
FIG. 5 illustrates exemplary camber and toe measurements over a finite rollback angle taken by an exemplary wheel alignment system.

FIG. 5 illustrates exemplary camber and toe measurements taken by an exemplary wheel alignment system, in which the data are measured by measurement head 408 and represent camber and toe of wheel 400. The exemplary data span a 360 degree rollback angle from starting point 500 to finish point 502, although in an embodiment only a portion thereof may be measured and utilized. Over the 360 degree rollback angle, camber data 506 and toe data 508 both represent sine waves. The sine waves represented by camber data 506 and toe data 508 are 90 degrees out of phase, because the camber and toe sensors in the measurement heads are mounted orthogonally to one another. The magnitude 510 of the sine waves is the same, and represents total runout magnitude. However, vertical offsets representing camber runout component 512 and toe runout component 514 may be measured at any point along the sine waves, and the alignment position may be measured at any phase relationship. The camber average value 516 is representative of the camber of a wheel relative to gravity, while the toe average value 518 represents the angle of one wheel relative to an adjacent wheel's measurement head. The value to be determined from the exemplary alignment system is the offset of each sensor when the wheels are in the alignment position, centered on their respective turntables. The alignment position is represented at center point 504, and the alignment position camber value 520 and alignment position toe value 522 correlate camber runout component 512 and toe runout component 514, respectively. Camber runout component 512 and toe runout component 514 may be calculated by performing the best fit circle calculation introduced above and described in further detail below, utilizing camber and toe data points over the rollback distance generated by the measured rollback angle. This angle may be between 30 degrees as indicated at first measurement end point 524 and 50 degrees as indicated at second measurement end point 526. Of course, it is to be understood that the rollback angle is not limited to this range and may be within any range that allows the wheels to remain on the turntables or alignment platform.

Figure 6:
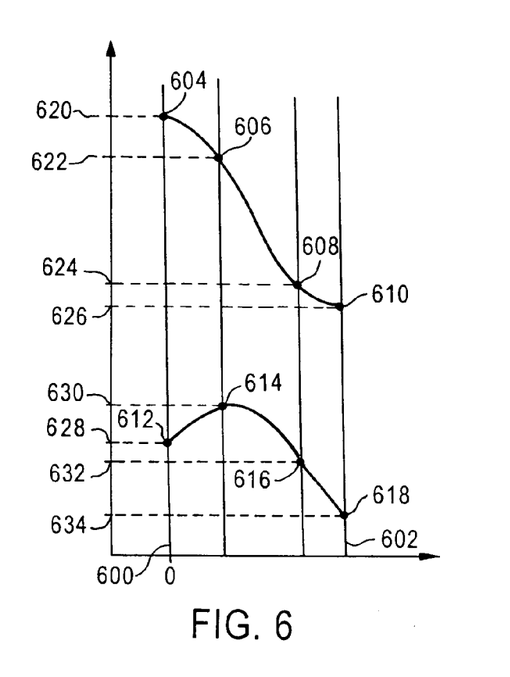
FIG. 6 illustrates exemplary camber and toe data over a finite rollback angle according to sensor angles and rotation angles utilized in an exemplary wheel alignment system.

FIG. 6 illustrates exemplary camber and toe data over a finite rollback angle according to sensor angles and rotation angles utilized in an exemplary wheel alignment system. The rollback angle spans from start point 600 to end point 602. Over that span, a plurality of camber measurements 604, 606, 608, 610 are taken and stored, and a plurality of toe measurements 612, 614, 616, 618 are taken. Camber measurements 604, 606, 608, 610 are taken at the same respective angles at which toe measurements 612, 614, 616, 618 are taken. That is, camber data point 604 and toe data point 612 are collected at the same moment in time, and are paired for purposes of calculations, as are all data points collected. Offset points 620, 622, 624 and 626 represent camber offset values from an unspecified reference point. Similarly, offset points 628, 630, 632 and 634 represent toe offset values from an unspecified reference point.

Figure 7:
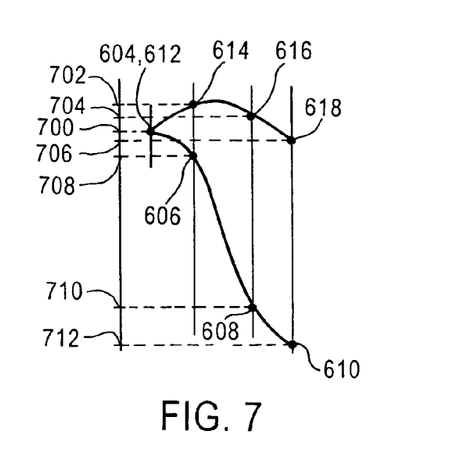
FIG. 7 illustrates exemplary camber and toe data offset from a fixed relative point as utilized by an exemplary wheel alignment method.

FIG. 7 illustrates exemplary camber and toe data offset from a fixed relative point 700 as utilized by an exemplary wheel alignment method. Camber value 604 and toe value 612 are situated to overlap at the fixed relative point 700. Camber values 614, 616 and 618 then correlate to relative offset points 702, 704 and 706, respectively. Similarly, toe values 606, 608 and 610 correlate to relative offset points 708, 710 and 712, respectively.

Figure 8:
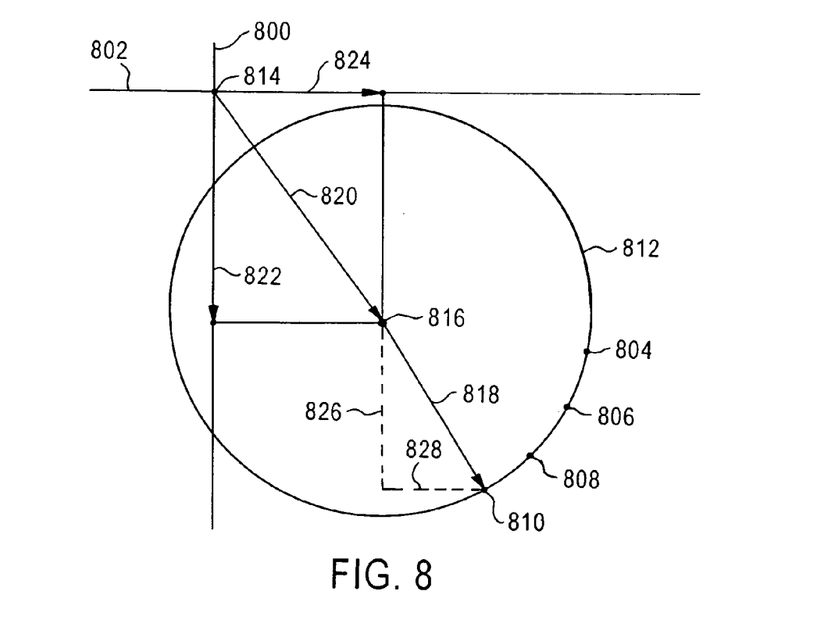
FIG. 8 illustrates wheel runout as calculated by an exemplary wheel alignment method.

FIG. 8 illustrates wheel runout as calculated by an exemplary wheel alignment method. The relative offset points 700 through 712 illustrated in FIG. 7 may be plotted as camber in the vertical axis 800 and toe in the horizontal axis 802. Plotted point 804 comprises camber 604 versus toe 612. Plotted point 806 comprises camber 606 versus toe 614. Plotted point 808 comprises camber 608 versus toe 616. Plotted point 810 comprises camber 610 versus toe 618 and represents the position for wheel alignment with wheels centered on the turnplates. Plotted points 804, 806, 808 and 810 thereby generally represent an arc of a circle 812, which can be calculated according to a best fit mathematical routine, for example, as described above. It will be understood by those skilled in the art that while a minimum of three plotted points is required to define the arc of a circle, more plotted points will provide data redundancy that may be used to verify data accuracy, such as by the RMS method described above, for example. Employing the best fit routines, circle 812 has a center 816 that represents the true measured value of camber 822 and toe 824, the combination of which is shown as vector 820. Runout vector 818 represents the runout in the wheel in both camber and toe planes, where vector 826 represents the camber plane runout and vector 828 represents the toe plane runout for the vehicle in the alignment position 810 with the wheels centered on the turnplates.

Figure 9:
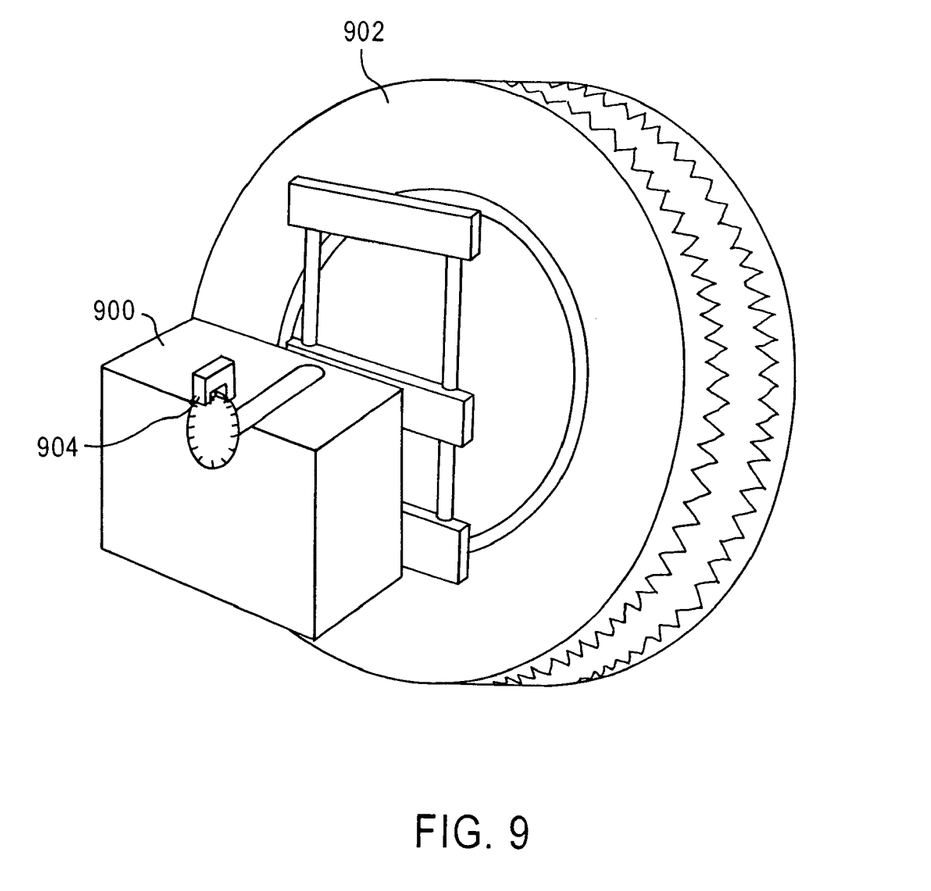
FIG. 9 illustrates an exemplary wheel alignment set up for measuring relative angles between sensor heads and wheels.

In another exemplary embodiment illustrated in FIG. 9, the measurement heads may be equipped with sensors to measure the relative angle between the head 900 and the wheel 902. Although these sensors may be encoders, potentiometers, or other relative motion sensors, in the present description the sensor is referred to as shaft encoder 904. In the exemplary embodiment, additional information is used to calculate the runout vectors of the measurement heads. For example, in FIG. 5, the relative angles between 504 and 524 and 526 are measured values. Similarly, in FIGS. 6 and 7, the horizontal scale is now a known measured angle for each data pair. As described previously, the relationships toe=M(sin(x)) and camber=M(cos(x)) now have the rollback angle x available from the shaft encoder 904 and may be solved in a more direct manner. It is to be understood that this method does not preclude the use of the previously described method of solving runout without the shaft encoder 904. Alternatively, both methods may be used and compared in order to provide cross-checking and exclude data points that are not consistent to improve the quality of the final calculated result.

Camber and toe planes' runout, once calculated as described above, may then be used by systems and methods within the scope of the present disclosures to compensate the camber and toe readings during subsequent wheel alignment process, so long as the wheel remains in the center of the turntable and is not rotated or elevated. It is to be understood that calculation of rolling angle and rolling are not necessary to calculate the runout vector. Rather, as described above, camber and toe measurements may be performed at an identical but unmeasured angle. When calculated at the same angle, though the angle is not known or measured, the correlated camber and toe measurements may be plotted together to describe the arc and extrapolated circle as described above. It will also be readily apparent to those skilled in the art that although the rollback angles need not be measured, the angular length of the arc represents the rollback angle. Therefore, a measurement check may be performed in some embodiments, wherein measurements from the four wheels may be compared to ensure that their respectively generated arc angles are substantially similar, within a predetermined tolerance.

In another embodiment, one or more of the measurement heads on the wheels of a vehicle undergoing an alignment process may be locked, such that it rotates with the rotating wheel. In this embodiment, the locked measurement head will take and record data not only from the track toe sensor and the camber inclinometer, but from the wheel pitch inclinometer as well. Note that in typical wheel alignment systems, the track toe signal may be lost after the head has undergone a pitch angle of about 10 degrees. Therefore, the angles of camber and head pitch may be used to produce a data set corresponding to item 506 in FIG. 5 and points 604, 606, 608, and 610 in FIG. 6. Using the relationship camber=M(cos(x)) the multiple points may be used to determine a value for the runout amount M and for the phase relationship of M, so that it may be split into components of toe runout and camber runout when the wheels are on the turnplates at the wheel alignment position. Potential errors in the sensors of a locked measurement head, which may be the result of a sensor measuring in an abnormal plane as it rotates with the wheel, may be compensated by characterizing accuracy of the sensor across varying planes before implementing it in an alignment system in which the measurement head would be locked. The characterizing data may then be stored and accessed to compensate for rotating sensor measurements, such as by comparing the sensor output to the stored characterizing data, and compensating the sensor output accordingly.

In another exemplary embodiment, an automated process detects whether or not a measurement head is locked, and subsequently chooses the appropriate method for measuring. The system may note characteristic changes in all sensor values, such as all head pitch sensors shifting in the same direction for a similar magnitude, or head shaft encoder change or lack thereof, to determine whether or not the measurement head is locked, or perform any of a number of other detection measurement that will be readily apparent to those skilled in the art.

In another exemplary embodiment, an alignment system may analyze data that have been collected and stored as described above, and identify points that do not follow predicted patterns or characteristics. For example, detection of a loose tie rod end may be accomplished by observing that the track toe data reflects deviations that are not matched in results of the camber sensor. Alternatively, detection of a shift of both track toe sensors in equal and opposite directions corresponding with camber data that does not match, might indicate that the wheels had been steered during the rolling process. In the exemplary wheel alignment system, the detected symptom may be displayed to a user, along with the probable cause and a suggested corrective action. The user may then perform the suggested corrective action before going through the steps of measuring wheel runout. Another example of a pattern to be detected involves monitoring of the wheel pitch sensor in a measurement head during a runout determination procedure in which the measurement heads are not locked. The wheel pitch sensor may be used to detect if the measurement head is sticking on the clamp shaft. More specifically, by using the wheel pitch sensor to monitor head level, an exemplary alignment system may monitor the head and, if it exceeds an upper threshold value, generate and communicate a warning to a user, directing the user to loosen the head locking mechanism.

In another exemplary embodiment, a plurality of the above concepts, methods and procedures may be employed, following a predetermined hierarchy of procedures. For example, elevated runout compensation may be assigned the lowest priority because of its potential for deleterious effects on alignment results. Locked measurement head runout determination techniques may be given a higher priority, while unlocked measurement head runout determination techniques might be assigned the highest priority. The exemplary system may include analysis software to guide a user to a more precise process if it is determined that data from an initially used process was flawed due to user technique, a problem with the vehicle, or an error in analysis of the data. In any of those events, an alternative runout determination technique may be selected by the exemplary system and suggested to the user.

In yet another exemplary embodiment, a runout determination technique may include real time analysis of collected data from the measurement heads, wherein the rolling angle of the wheels is calculated. Although it is to be understood, as described above, that the angle measurement is not required for calculation of the runout vector, it may be employed in other calculations, which a user may find useful. An exemplary method for measuring the rolling angle is including a shaft encoder between the wheel clamp and the measurement head.

In another exemplary embodiment, a runout determination technique may include a real time statistical validity check. In this embodiment, an alignment system may control the measurement process until sufficient data is acquired to satisfy a statistical validity check and have the ability to abort a measurement procedure in which the statistical validity check is not able to be satisfied. For example, if the suspension of a vehicle undergoing an alignment procedure does not comply with a real time statistical validity check, the exemplary system may direct a user to perform additional measurements at additional positions, which will allow an averaging of a larger number of data points. Data points falling outside of a tolerance range may then be discarded, increasing the reliability and accuracy of the final results. On the other hand, if, for example, a loose tie rod end causes the measured values when rolling in one direction to be different than when rolling in the other direction, the exemplary system may direct a user to repeat the measurement procedure again in each direction, ensuring that the measured values are repeatable before warning the operator to replace worn parts, or before proceeding in an appropriate manner as determined by the situation.

Figure 10:
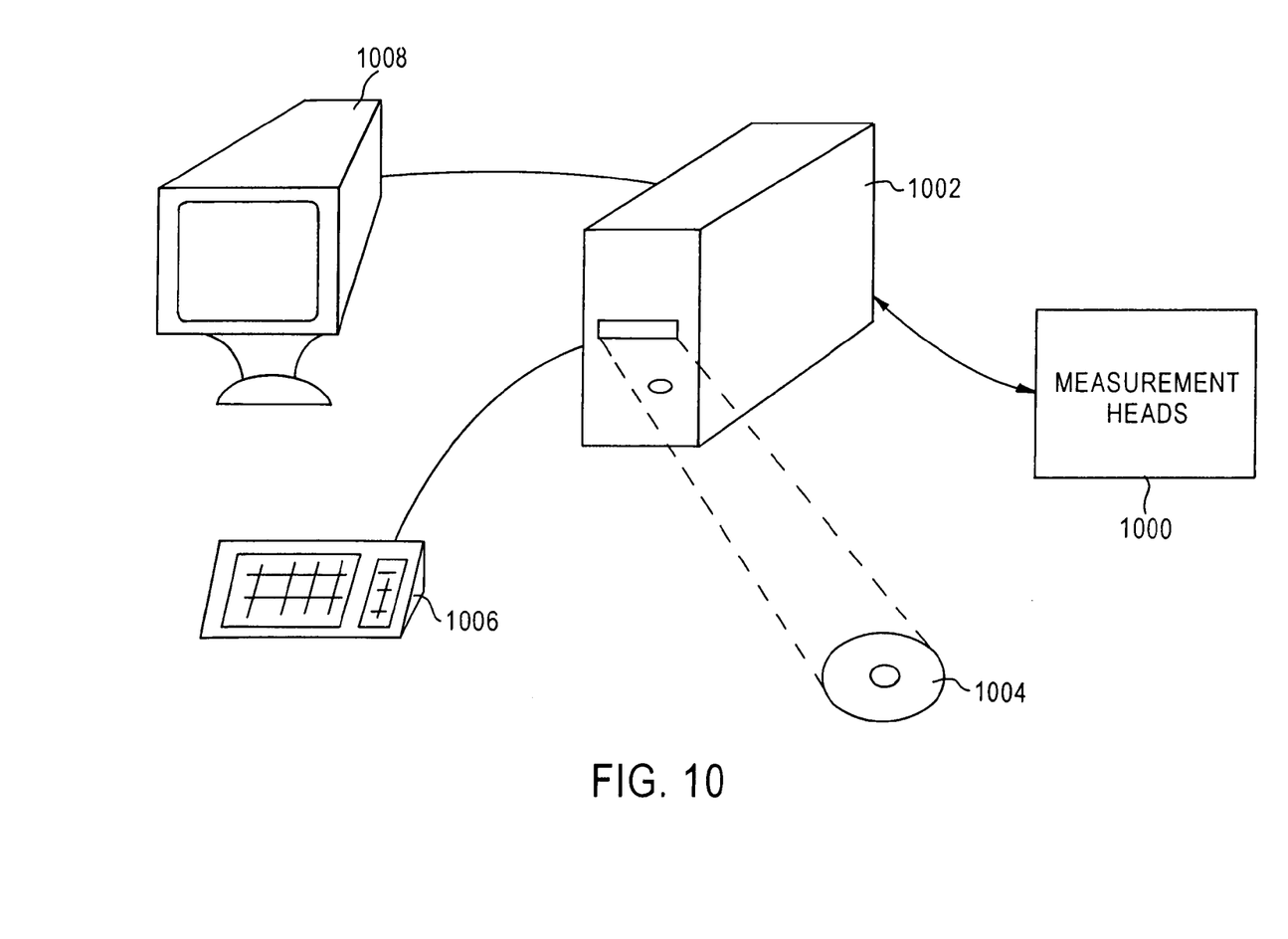
FIG. 10 illustrates components of an exemplary runout-compensated wheel alignment system.

FIG. 10 illustrates components of an exemplary runout-compensated wheel alignment system. Measurement heads 1000 measure and output data representing various alignment procedure measurements at a plurality of rollback angles. For example, data including camber, toe and head pitch may be measured as described above, and generated as an output of measurement heads 1000. These data may be communicated to, stored within and analyzed by a computer 1002 or other processing device attached to a memory storage unit. Computer-readable media 1004 may contain software that, when executed by computer 1002, performs the methods or functionality disclosed herein. Alternatively, program code instructions embodying these methods may be stored directly in memory within computer 1002. Computer 1002 may be used to implement the various calculations and analyses employed by the exemplary methods or functions described above. A user may interact with the exemplary system through user input device 1006 such as a keyboard, mouse or other data input mechanism. Results and recommendations that are generated according to the various methods described above may be reported to the user on a display screen 1008. The exemplary system may comprise individual components or may instead be housed in a single unit that is operatively coupled to measurement heads 1000 by wireline or wireless communication.

Figure 11:
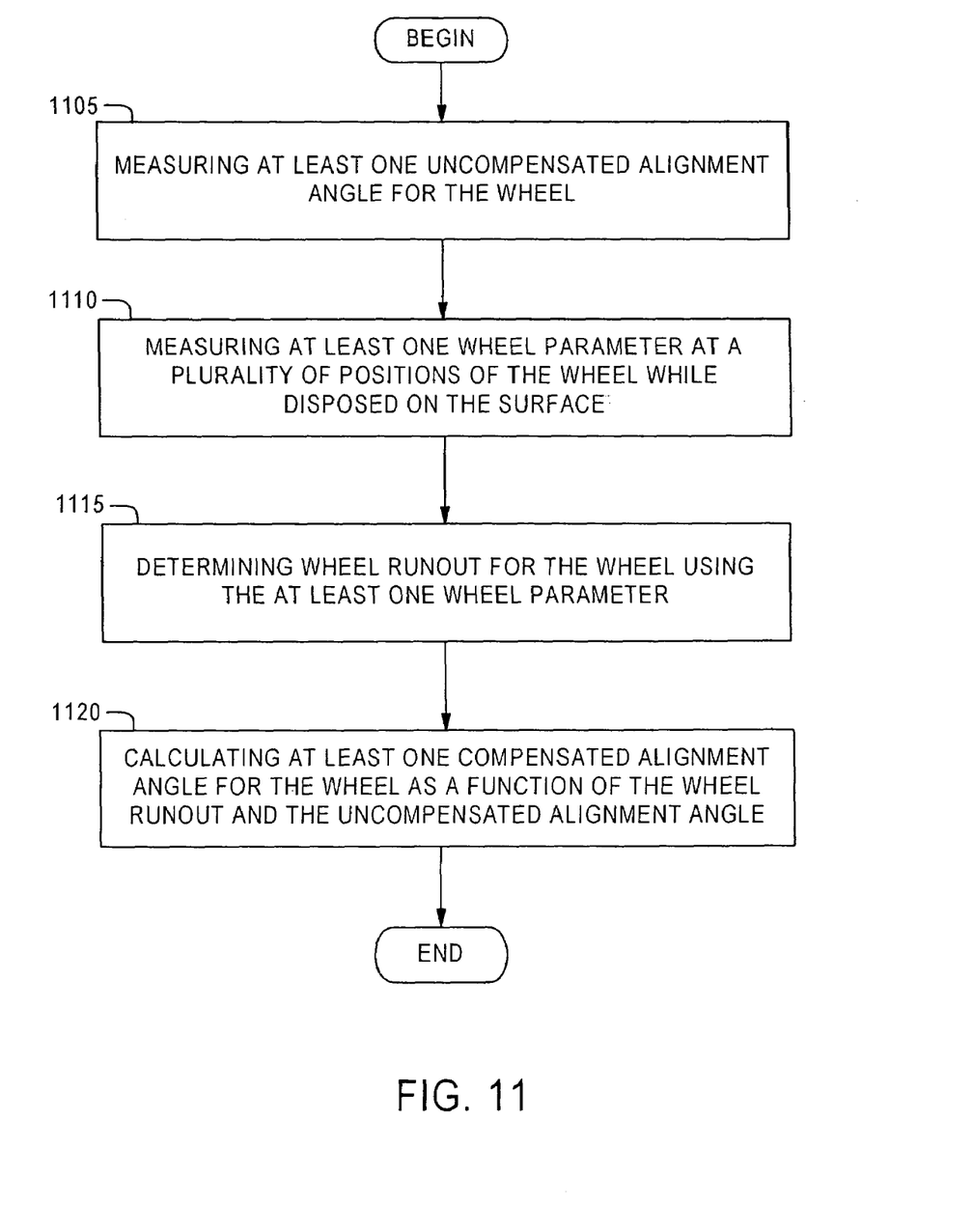
FIG. 11 illustrates a method for performing a wheel alignment according to an embodiment of the present disclosure.

FIG. 11 illustrates a method for performing a wheel alignment according to an embodiment of the present disclosure. The illustrated method begins with measuring 1105 at least one uncompensated alignment angle for the wheel. At step 1110, at least one wheel parameter is measured 1110 at a plurality of positions of the wheel while disposed on the surface. Wheel runout is determined 1115 for the wheel using the at least one wheel parameter. At step 1120, at least one compensated alignment angle is calculated for the wheel as a function of the wheel runout and the uncompensated alignment angle.

Having described embodiments of wheel alignment with surface-oriented runout determination (which are intended to be illustrative and not limiting), it is noted that modifications and variations can be made by persons skilled in the art in light of the above teachings. It is therefore to be understood that changes may be made in the particular embodiments disclosed that are within the scope and spirit of the invention as defined by the appended claims and equivalents.

What is claimed is:

1. A method for calculating a wheel alignment angle using measurement sensors mounted on a wheel, the method comprising:
    disposing the wheel on a surface such that the wheel is rotatable while maintaining contact with the surface;
    measuring at least one uncompensated alignment angle for the wheel;
    measuring at least one wheel parameter at a plurality of positions of the wheel while disposed on the surface;
    determining wheel runout for the wheel using the at least one wheel parameter;
    calculating a predetermined threshold runout error;
    determining a need for runout compensation, based on the amount of runout in comparison with the predetermined threshold;
    calculating at least one compensated alignment angle for the wheel as a function of the wheel runout and the uncompensated alignment angle if the runout is above the predetermined threshold runout error; and
    performing a wheel alignment procedure using the compensated alignment angle.

2. The method of claim 1, wherein measuring at least one wheel parameter at a plurality of positions of the wheel while disposed on the surface further comprises:
    performing at least three measurements of camber and toe.

3. The method of claim 2, further comprising:
    determining a circle whose circumference substantially coincides with a combination of the at least three measurements of camber and toe.

4. The method of claim 3, further comprising:
    calculating an error value for the circle; and
    declaring an error event responsive to the error value exceeding a predetermined threshold.

5. The method of claim 1, further comprising:
    iteratively solving an equation for a runout vector.

6. The method of claim 1, further comprising:
    performing the wheel runout determination in real-time;
    comparing the wheel runout to a set of criteria including a minimum number of points and minimum rollback angle; and
    terminating the wheel runout determination responsive to the comparing.

7. The method of claim 1, further comprising:
    measuring a rollback angle using sensor.

8. The method of claim 1, further comprising:
    calculating a rollback angle based on the measuring of at least one wheel parameter at a plurality of positions of the wheel while disposed on the surface.

9. The method of claim 1, further comprising:
    calculating a rollback angle based on an inclinometer measurement.

10. The method of claim 1, further comprising:
    assigning a priority to a test for adaptively guiding a user through an alignment process.

11. A method for measuring runout of a wheel, the method composing:
    disposing the wheel on a surface such that the wheel is rotatable while maintaining contact with the surface;
    rotating the wheel to a first position;
    measuring camber and toe at the first position to generate a first data point;
    rotating the wheel to a second position;
    measuring camber and toe at the second position to generate a second data point;
    rotating the wheel to a third position;
    measuring camber and toe at the third position to generate a third data point;
    determining a circle whose circumference substantially coincides with a combination of the first, second and third data points;
    measuring the radius of the circle;
    calculating a predetermined threshold radius;
    determining a need for runout compensation based on the radius in comparison with the predetermined threshold radius; and performing a wheel alignment procedure using the determined need for runout compensation.

12. A method for calculating a wheel alignment angle using measurement sensors mounted on a wheel, the method comprising:
    disposing the wheel on a surface such that the wheel is rotatable while maintaining contact with the surface;
    measuring at least one uncompensated alignment angle for the wheel;
    measuring at least one wheel parameter at a plurality of positions of the wheel while disposed on the surface;
    determining wheel runout for the wheel using the at least one wheel parameter;
    calculating a predetermined threshold runout error;
    determining the need for runout compensation, depending upon whether the runout is above or below the predetermined threshold runout error; and
    performing a wheel alignment procedure using the determined need for runout compensation.

13. A system for measuring runout of a wheel, the system comprising:
    means for disposing the wheel on a surface such that the wheel is rotatable while maintaining contact with the surface;
    means for measuring camber and toe at a first position to generate a first data point;
    means for measuring camber and toe at a second position to generate a second data point;
    means for measuring camber and toe at a third position to generate a third data point;
    means for determining a circle whose circumference substantially coincides with a combination of the first, second and third data points;

means for measuring the radius of the circle;
means for calculating a predetermined threshold radius;
means for determining a need for runout compensation based on the radius in comparison with the predetermined threshold radius; and means for performing a wheel alignment procedure using the determined need for runout compensation.

* * * * *